Dec. 9, 1941.   J. W. DAWSON   2,265,270
WELDING MACHINE
Filed Aug. 13, 1938
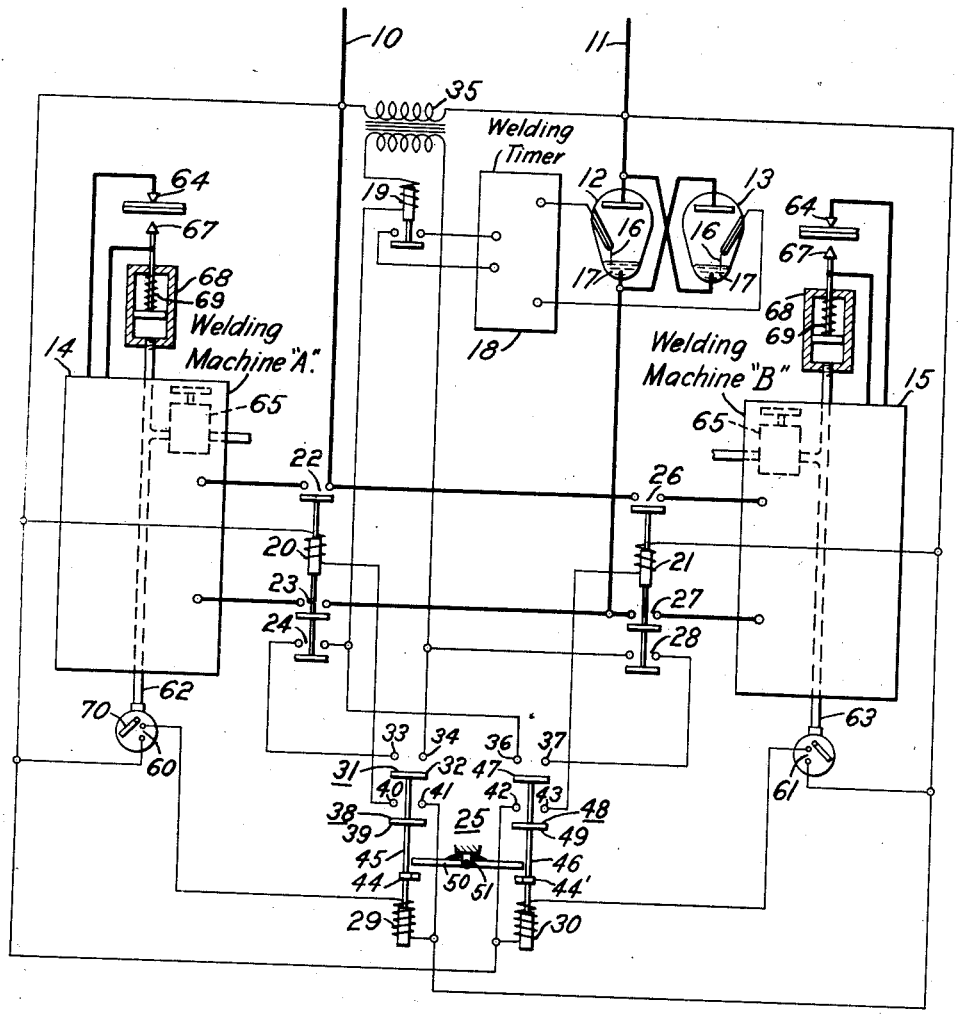
WITNESSES:
Wm. B. Sellers
R. W. Bailey
INVENTOR
John W. Dawson.
BY
F. W. Leyle
ATTORNEY Patented Dec. 9, 1941

2,265,270

UNITED STATES PATENT OFFICE 2,265,270

WELDING MACHINE

John W. Dawson, Auburndale, Mass., assignor to Westinghouse Electric & Manufacturing Company, East Pittsburgh, Pa., a corporation of Pennsylvania Application August 13, 1938, Serial No. 224,707

5 Claims. (Cl. 171—97)

My invention relates to welding machines and especially to a plurality of welding machines connected to a common source.

An object of my invention is to provide a plurality of welding machines connected to a common source of welding current and a common timer therefor, together with means for preventing the welding current being utilized in more than one machine at the same time.

Another object of my invention is to provide a welding system incorporating a plurality of welding arrangements supplied through common valve means in which the initiation of a welding operation by one of said arrangements shall preclude any interference from other welding arrangements until the culmination of a welding operation by said first named arrangement.

A further object of my invention is to provide a welding system which incorporates a plurality of welding arrangements supplied through common valve means in which the power for welding shall be distributed in succession among any of the said arrangements that happen to be in operation.

Other objects and advantages of the invention will be apparent from the following description and drawing, in which the single figure is a diagrammatic circuit illustrating a preferred embodiment of my invention.

In some assembly lines, adjacent welding machines are not utilized at the same time. One worker will use the welding machine while the adjacent welding machine is idle and then the second welding machine will be in operation after the first welding machine is operated. Each worker must have a welding machine conveniently at hand so that the assembly line is not delayed. Each of these welding machines, however, has a separate welding timer to automatically govern the time of the weld. This welding timer is rather expensive and must be carefully adjusted and kept in repair.

My invention contemplates saving the expense and trouble of duplicating the welding timer for adjacent welding machines where such welding machines are not apt to be in operation at the same time, or where adjacent workers can adjust their assembly work so that the welding machines can be used alternately.

In the drawing, I have illustrated a common source 10 and 11 of current to be applied through electric valves 12 and 13 to welding machines, such as 14 and 15. The electric valves 12 and 13 may be connected together in a reverse order so as to provide full wave control of the welding current. These electric valves are preferably of the immersed igniting electrode type using a mercury pool as a cathode. The immersed ignition electrode 16 is preferably a high resistance electrode such as boron carbide immersed in the mercury cathode 17 and this igniting electrode 16 is connected in each instance to a welding timer 18 which may be of the type described and explained in detail in my copending application, Serial No. 142,564, filed May 14, 1937, for Welding timing circuits, since matured into Patent No. 2,189,601, dated Feb. 6, 1940. The welding timer is operated through any suitable relay 19 connected to the source of current. Each welding machine has preferably connected thereto a relay 20 and 21 having preferably three contacts or switches operated thereby. The relay 20, for example, has the switch 22 connecting the line 10 to the welding machine A; the switch 23 connecting the discharge current through electric valves 12 and 13 from the line 11 and a switch 24 connected electrically to an interlock 25 to be hereafter described. The relay 21 likewise controls the switch 26 connecting the welding machine B to the line 10, the switch 27 connecting the welding machine B to the line 11 through the electric valves 12 and 13 and the switch 28 connected to the interlock 25.

The interlock 25 preferably comprises two relay coils 29 and 30, each of which operates two switches. The one switch 31 comprises a bar 32 and contacts 33 and 34. One of these contacts 33 is connected to the switch 24 of the auxiliary switch of the relay 20 and the point 34 is connected to one of the contact points on switch 28 of relay 21 and also through the secondary of the transformer 35 through the relay 19 of the welding timer to the other contact of the switch 24 and the contact 36 of the switch 37 operated by relay 30. The switch 38 on relay 29 comprises preferably a bar contact 39 and two points 40 and 41. The point 40 connects through the coil of the relay 20 to one side of the line 10 and the other contact 41 extends to one side of the coil of the relay 29 and also to the other side of the line 11. In regard to relay 30, the switch 48 comprises the bar 49 and contacts 42 and 43. 42 is connected to one side of the coil of the relay 30 and also to the line 10. 43 is connected to one side of the relay coil 21 to the line 11. The interlock 25 also comprises a stop member 44 on the shaft 45 carrying the contact bars 32 and 39, operated by the relay 29. Another stop bar 44' is placed on the shaft 46 supporting the contact bars 49 and 47 operated by relay 30. A bar 50 is pivotally mounted at 51 between the two shafts 45 and 46 so as to have its edges in the path of travel of the stops 44 and 44'. The distance between the normal open positions of 44 and 44' and the bar 50 is less than the distance between the bars 31 and 39, 49 and 47 and the contact points so that if both the stops 44 and 44' are actuated at the same time, they will both strike the bar 50 on opposite sides of the pivot and prevent the contact of any of the switches. If only one shaft, say 45, is operated, the stop 44 will tilt the bar 50 upward on the left-hand side until contact is made between the contact bars 32 and 39 and the contacts. The right-hand end of the bar 50 will be depressed downward against or very close to the stop 44' so that shaft 46 cannot be raised to make the contact between the contact points and the contact bars supported on this shaft. Both the relays 29 and 30 cannot be operated simultaneously to make contacts and if one is operated, the other cannot be operated until the first one is released.

I have rather diagrammatically illustrated my preferred method of actuating the relays 29 and 30 by showing them connected to a switch 60 and 61 operated by the pressure system 62 and 63 of the respective welding machines 14 and 15. These welding machines are preferably of the type in which the one electrode 64 is applied to the work. A valve 65 is turned on and this operates a pressure behind the other electrode 67 to make contact to the work and simultaneously turn on the welding current for the time set by the welding timer 18 when the electrode 67 is then automatically withdrawn from the work. This operation involves a pressure cylinder 68 to move the electrode 67 in contact with the work and a spring 69 to withdraw the electrode 67 from the work upon release of the pressure in the cylinder. If desired a conduit connection may be applied to ensure pulling the electrode away from the work upon release of the valve 65. In my invention I preferably have the conduits 62 and 63, connected to the cylinder 68, so that when the valve 65 is actuated to make contact to the load, the same pressure will actuate the switch 60 or 61 as the case may be. More specific details of a pressure welding electrode system which could be adapted to my invention, can be found in the copending application of Ralph N. Stoddard, S. N. 168,208, filed October 9, 1937 for Automatic release circuits, since matured into Patent No. 2,147,468, dated Feb. 14, 1939.

If the switch 60 is actuated, then the relay 29 is actuated because it is connected by the switch 60 across the power lines 10 and 11. The contact bar 32 makes contact with the points 33 and 34 to actuate the relay 19 and the welding timer to control the discharge time and hence the welding current through the valves 12 and 13. The contact bar 39 by its contacts with 40 and 41, actuates the relay 20 to apply the welding current to the welding machine 14 for the time determined by the welding timer 18. The movement of 44 on the shaft 45 of the relay 29 has tilted the righthand side of the bar 50 downwardly so that it will prevent the movement of the shaft 46 of the relay 30. Accordingly, the welding machine 15 cannot be operated at the same time as welding machine 14. The moment, however, that the foot valve is released, the relay 29 is released by the pressure in 62 being released and the switch 60 being opened by any suitable means such as a spring applied to the contact lever 70. The relay 30 can then be operated to apply the welding current to welding machine 15 through operation of the relay 21.

It is apparent, however, that many modifications may be made in the arrangement, number and specific type of elements illustrated. Accordingly, I desire only such limitations to be imposed upon the following claims as is necessitated by the prior art.

I claim as my invention:

1. In combination, a plurality of units of electrical apparatus, each unit intended to draw current in successive intervals separated by periods of time in which the unit draws no current, a source of current for said units, a relay system for connecting each of said units to said source of current, and means actuated by the movement of the first relay system actuated for preventing the actuation of the rest of the relay systems until the first relay system is released.

2. In combination, a plurality of units of electrical apparatus, each unit intended to draw current in successive intervals separated by periods of time in which the unit draws no current, a source of current for said units, a group of relays, each relay of said group being connected to one of said units and comprising contacts connecting said source of current to said unit, an actuating coil mechanism for making and breaking said contacts, a second group of relays associated together, each of said second group of relays being connected to the actuating coil of one of the first group of relays, and means actuated by the first energization of one of the relays of said second group for preventing the actuation of the rest of said second group of relays.

3. For use with a source of supplying electric power, a first load having a first pair of relatively movable elements, a second load having a second pair of relatively movable elements, common valve means interposed between said source and said movable elements, mechanically actuable interlocking relay means common to said loads, means to be actuated on the movement of either of said relatively movable elements for operating said interlocking means, before current flows through said loads, to prevent current flow through the other loads until after current has ceased to flow through the first mentioned load, and means to be actuated by said interlocking means after it has operated for initiating current flow through said common valve means and the movable elements of said first named arrangement.

4. For use with a source for supplying electric power, a first load having a first pair of relatively movable elements, a second load having a second pair of relatively movable elements, common valve means interposed between said source and said movable elements, interlocking relay means common to said loads, means to be actuated on the movement of either of said relatively movable elements for operating said interlocking means, before current flows through said loads, to prevent current flow through the other loads until after current has ceased to flow through the first mentioned load, and means to be actuated by said interlocking means after it has operated for initiating current flow through said common valve means and the movable elements of said first named arrangement.

5. For use with a source for supplying electric power, a first load having a first pair of relatively movable elements, a second load having a second pair of relatively movable elements, common valve means interposed between said source and said movable elements, interlocking relay means common to said loads, means to be actuated on the movement of either of said relatively movable elements for operating said interlocking means, before current flows through said loads, to prevent current flow through the other loads until after current has ceased to flow through the first mentioned load, means to be actuated by said interlocking means after it has operated for initiating current flow through said common valve means and the movable elements of said first named arrangement, and means to be actuated by the engagement of the movable elements of the second mentioned load, if said engagement takes place during the operation of the movable elements of the first named load, for actuating said interlocking means to preclude a second operation of the first named movable elements until current has ceased to flow during an intermediate operation of said other load.

JOHN W. DAWSON.